(12) United States Patent
Toyooka

(10) Patent No.: US 7,646,460 B2
(45) Date of Patent: Jan. 12, 2010

(54) LIQUID CRYSTAL DISPLAY PANEL AND LIQUID CRYSTAL DISPLAY DEVICE

(75) Inventor: Yukiko Toyooka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 645 days.

(21) Appl. No.: 11/047,234

(22) Filed: Jan. 31, 2005

(65) Prior Publication Data
US 2006/0066789 A1    Mar. 30, 2006

(30) Foreign Application Priority Data
Sep. 24, 2004    (JP) .............................. 2004-278079

(51) Int. Cl.
G02F 1/1337    (2006.01)
(52) U.S. Cl. ...................... 349/130; 349/129
(58) Field of Classification Search ........................ None
See application file for complete search history.

(56) References Cited

U.S. PATENT DOCUMENTS

| | | | | |
|---|---|---|---|---|
| 5,208,687 | A * | 5/1993 | Yoshida et al. ................. | 349/91 |
| 5,673,092 | A | 9/1997 | Horie et al. | |
| 6,061,117 | A | 5/2000 | Horie et al. | |
| 6,344,883 | B2 | 2/2002 | Yamada et al. | |
| 6,671,018 | B2 * | 12/2003 | Lee et al. ..................... | 349/123 |
| 6,731,356 | B2 | 5/2004 | Yamada et al. | |
| 7,248,318 | B2 | 7/2007 | Nakamura et al. | |
| 7,304,703 | B1 * | 12/2007 | Takeda et al. ................. | 349/129 |
| 2001/0006410 | A1 | 7/2001 | Yamada et al. | |
| 2002/0036744 | A1 * | 3/2002 | Kubo et al. .................. | 349/144 |
| 2002/0085154 | A1 * | 7/2002 | Hattori et al. ................. | 349/123 |
| 2002/0097362 | A1 | 7/2002 | Yamada et al. | |
| 2003/0043336 | A1 * | 3/2003 | Sasaki et al. ................. | 349/187 |
| 2003/0231272 | A1 | 12/2003 | Nakamura et al. | |
| 2007/0206129 | A1 | 9/2007 | Nakamura et al. | |

FOREIGN PATENT DOCUMENTS

| | | |
|---|---|---|
| JP | 8-292423 | 11/1996 |
| JP | 10-186330 | 7/1998 |
| JP | 11-212093 | 8/1999 |
| JP | 2001-235748 | 8/2001 |
| JP | 2003-075839 | 3/2003 |
| JP | 2004-4329 | 1/2004 |

* cited by examiner

*Primary Examiner*—David Nelms
*Assistant Examiner*—Lucy P Chien
(74) *Attorney, Agent, or Firm*—Greer, Burns & Carin, Ltd.

(57) ABSTRACT

A liquid crystal panel and a liquid crystal display device having stable liquid crystal alignment, excellent display quality, and high display response speed are obtained. In this liquid crystal panel, uneven portions for bending the alignment of liquid crystal molecules towards the direction along the substrate surface are installed on the surfaces where the liquid crystal layer contacts its adjacent layers, and the liquid crystal layer comprises a liquid crystal having a positive dielectric constant anisotropy, and a polymer obtained by subjecting a polymerizable compound in the liquid crystal layer to irradiation with active energy rays, with or without application of a voltage.

13 Claims, 7 Drawing Sheets

LIQUID CRYSTAL DISPLAY PANEL AND LIQUID CRYSTAL DISPLAY DEVICE

CROSS-REFERENCE TO RELATED APPLICATIONS

This application is based upon and claims the benefit of priority from the prior Japanese Patent Application No. 2004-278079, filed on Sep. 24, 2004, the entire contents of which are incorporated herein by reference.

BACKGROUND OF THE INVENTION

1. Field of the Invention

The present invention relates to an MVA (Multi-domain Vertical Alignment) mode liquid crystal display device, and particularly to an MVA-mode liquid crystal display device having high display response speed and high quality.

2. Description of the Related Art

An MVA-mode liquid crystal display device (see, for example, Japanese Unexamined Patent Application Publication No. H11-242225, claims) is a liquid crystal display device for which the vertical alignment technology for realizing a high contrast and high response speed, and the multi-domain technology for realizing a wide viewing angle are combined.

In an MVA-mode liquid crystal display device, since part of the liquid crystal molecules are aligned with some tilting caused by previously installed protrusions or the like, it is possible to make the display response speed higher compared with conventional liquid crystal display devices. Also, since the liquid crystal molecules are aligned in plural separate orientations, a wide viewing angle of 160° towards the upside, downside, right and left directions at a contrast ratio of 10 or higher is realized.

In addition, in this technology, it is not necessary to perform a rubbing treatment, which is a major cause of decrease in the productivity, owing to a body for regulating the alignment (structures having uneven portions such as protrusions, or slit patterns in an electrode) installed on the substrates to realize the multi-domain alignment. Accordingly, a high productivity is realized.

However, even in this MVA-mode liquid crystal display device, there is a problem of not always being able to have a sufficient response characteristics. For example, when a liquid crystal is aligned with application of a voltage, the speed for propagating the tilting of alignment of the liquid crystal is relatively small in a region where there are no structures for regulating the tilting direction, and accordingly, it needs some time for the liquid crystal molecules in the whole pixel to respond.

Particularly in a lower region of the gray scale, there is a problem that the propagation of liquid crystal alignment is slower due to a lower application voltage. The response time would be three times or more of the usual value.

To solve the above-described problems, liquid crystal display devices were designed to have a constitution in which the liquid crystal molecules were aligned symmetrical to each other about the center surface between a pair of substrates, or symmetrical to each other about a certain surface perpendicular to the substrates, so that only liquid crystal molecules existing locally near the structures were aligned in the bend mode by the slopes of the structures to contribute to the display. As a result, the time required for the liquid crystal to be aligned became shorter, and the display response speed was improved (see for example, Japanese Unexamined Patent Application Publication No. 2001-235748, claims). However, MVA-mode liquid crystal display devices employing such bend alignment had a problem of unstable liquid crystal alignment. For example, when the surface of a liquid crystal panel was pressed with a finger, there appeared marks, which remained or did not disappear for a long time.

In addition, there is a strong need for further improvement of the display response speed, as television sets with liquid crystal displays are becoming popular.

The present invention is directed to solving such problems with respect to the stability of liquid crystal alignment, and to providing a liquid crystal panel and a liquid crystal display device that have stable liquid crystal alignment, excellent display quality, and high display response speed. Other objects and advantages according to the present invention will be clarified by the following explanation.

SUMMARY OF THE INVENTION

According to one aspect of the present invention, provided is a liquid crystal panel having a liquid crystal layer sandwiched between a pair of substrates, wherein: uneven portions for bending the alignment of liquid crystal molecules towards the direction along the substrate surface are installed on at least one of two liquid crystal layer contacting surfaces where the liquid crystal layer contacts its adjacent layers; and the liquid crystal layer comprises a liquid crystal having a positive dielectric constant anisotropy, and a polymer obtained by subjecting a polymerizable compound in the liquid crystal layer to irradiation with active energy rays, irradiation with active energy rays and heat curing, or heat curing, with or without application of a voltage.

By this aspect of the present invention, a liquid crystal panel with stable liquid crystal alignment, excellent display quality and high display response speed is obtained.

Preferable are that at least one of the layers adjacent to the liquid crystal layer is a vertical alignment control film; that the layers adjacent to the liquid crystal layer are not vertical alignment control films, and the polymer has a property to align liquid crystal molecules perpendicular to the surface of the polymer; that the polymer has been formed by polymerization of the polymerizable compound with application of a voltage to the liquid crystal layer; that the uneven portions are present on both two liquid crystal layer contacting surfaces, and the uneven portions on both two liquid crystal layer contacting surfaces are disposed, substantially overlapped with each other when seen along the direction perpendicular to the substrate surface; that the liquid crystal molecules are aligned substantially symmetrical to each other about the center surface between the pair of substrates; that the uneven portions are present only on one of the two liquid crystal layer contacting surfaces; that the liquid crystal molecules are aligned substantially symmetrical to each other about a certain surface perpendicular to the substrates; that the thickness of the liquid crystal layer is controlled by the protruding parts of the uneven portions; that the panel is a multi-domain mode liquid crystal panel with the uneven portions having stripe shapes in plural directions in a pixel when seen along the direction perpendicular to the substrate surface; and that a polarizing plate is disposed at the outside of each substrate, and an optical compensation film is sandwiched between each of the polarizing plates and each of the substrates.

According to another aspect of the present invention, provided is a liquid crystal display device equipped with the above-described liquid crystal panel. By this aspect of the present invention, a liquid crystal display device with stable liquid crystal alignment, excellent display quality and high display response speed is obtained.

DESCRIPTION OF THE PREFERRED EMBODIMENTS

Figure 1:
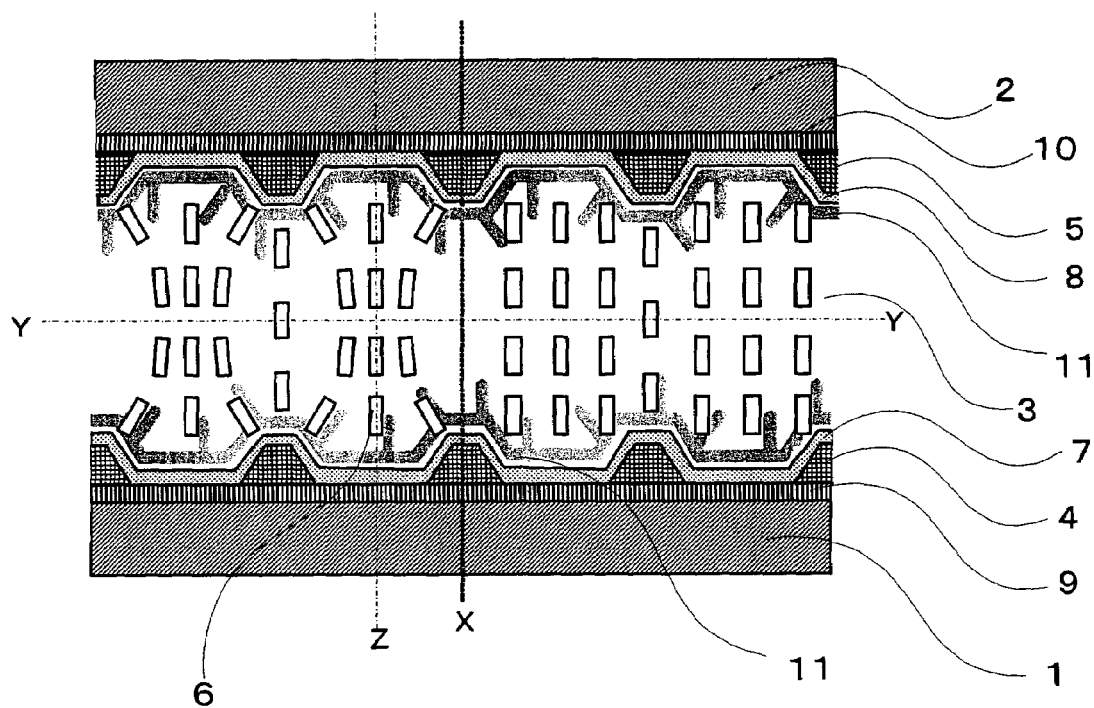
FIG. 1 is a schematic side cross-sectional view of an essential part of a liquid crystal panel according to the present invention.

Embodiments according to the present invention will now be described below, using drawings, examples, etc. These drawings, examples, etc., and descriptions are for demonstrating the present invention, and do not limit the scope of the invention. Needless to say, other embodiments can be included in the scope of the present invention as long as they conform to the essential character of the present invention. In the figures, the same reference numerals or signs represent the same elements.

In the liquid crystal panel according to the present invention, a liquid crystal layer is sandwiched between a pair of substrates, uneven portions for bending the alignment of liquid crystal molecules towards the direction along the substrate surface are installed on at least one of two liquid crystal layer contacting surfaces where the liquid crystal layer contacts its adjacent layers, and the liquid crystal layer comprises a liquid crystal having a positive dielectric constant anisotropy, and a polymer obtained by subjecting a polymerizable compound in the liquid crystal layer to irradiation with active energy rays, irradiation with active energy rays and heat curing, or heat curing, with or without application of a voltage. It is particularly preferable that this liquid crystal panel is a multi-domain mode liquid crystal panel wherein the alignment of the liquid crystal molecules is bent in plural directions within a pixel, by the allocation of the above-described uneven portions, so as to increase the freedom in the viewing angle.

In the above-described case, when alignment control films are required, vertical alignment control films are used. The vertical alignment control films are installed in contact with the liquid crystal layer. When vertical alignment control films are not used, the above-described polymer is made to have a property of aligning the liquid crystal molecules in the direction perpendicular to the surface of the polymer. Even when the above-described polymer has a property of aligning the liquid crystal molecules in the direction perpendicular to the surface of the polymer, vertical alignment control films may also be installed. In this case, a vertical alignment control film may be installed only on one side of the liquid crystal layer.

Here, it is to be noted that the "liquid crystal layer contacting surface" according to the present invention does not necessarily mean the surface of a simple substrate. It means the surface of a layer that the liquid crystal layer actually contacts. For example, when an alignment control film is installed to contact the liquid crystal layer, the "liquid crystal layer contacting surface" according to the present invention means the surface of the alignment control film.

In addition, uneven portions may be any one of those only composed of protrusions, those only composed of recessions, and those composed of protrusions and recessions. The shape of the cross-section of the uneven portions may be any shape as long as it can bend the alignment of liquid crystal molecules towards the direction along the substrate surface. Semicircular, semioval, and trapezoidal are examples of the cross-sectional shape. Such uneven portions may be prepared by forming a structure having a form capable of providing such unevenness between the substrates. The structure itself does not necessarily contact with the liquid crystal layer. There is no particular limitation to the size (height or depth) of the unevenness, but a value of 2 μm or larger is preferable.

Hereupon, an example of a liquid crystal panel of a multi-domain mode liquid crystal display device according to the present invention, will be explained, in reference to FIGS. 1 and 2. It is to be noted that active elements such as TFT's, polarizing plates, etc. are not shown in the following figures.

FIG. 1 is a schematic side cross-sectional view (a view seen along the direction in parallel with the substrate surface) of an essential part of a liquid crystal panel of a multi-domain mode liquid crystal display device according to the present invention. The left side of the dotted line X-X in the center shows a state in which no voltage is applied, and the right side shows a state in which a voltage is applied. As FIG. 1 shows, a highly transparent photoresist, for example, a positive-type photoresist PC-403 (trade name, supplied from JSR) is applied onto a transparent electrode 9 on the TFT (thin film transistor) side substrate (TFT substrate) 1, the TFT being made of ITO (indium-tin oxide), and a transparent electrode 10 on the CF (color filter) side substrate (CF substrate) 2, followed by patterning, so that protrusions 4 and 5 (that is protruding parts) having a semicircular cross-section with a width of 5 μm and a height of 3 μm, are formed, and vertical alignment control films 7 and 8 are installed all over the surfaces, for example.

The protrusions 4 and 5 are disposed as overlapped with each other when seen along the direction perpendicular to the substrate surface. That is, the protrusions 4 and 5 face each other, as substantially overlapped with each other in the projection. Liquid crystal molecules 6 having a positive dielectric constant anisotropy are introduced in the space between the substrates formed by a spacer (not shown). The thickness of the liquid crystal layer or the cell gap may be set to about 10 μm.

As shown in FIG. 1, a liquid crystal panel according to the present invention comprises a polymer obtained by making a liquid crystal having a positive dielectric constant anisotropy existing together with a polymerizable compound in the liquid crystal layer, followed by active energy ray irradiation onto the liquid crystal layer with voltage or without voltage application. This polymer is formed on the liquid crystal layer contacting surface. This polymer part will be called a polymer layer, hereafter. This layer is indicated by numeral 11 in FIG. 1. In FIG. 1, the liquid crystal layer 3 contains the liquid crystal molecules 6 and the polymer layer 11. The fact that the polymer is formed on the liquid crystal layer contacting surface, can be confirmed by taking out the liquid crystal layer contacting surface, washing it, and analyzing the surface.

Figure 2:
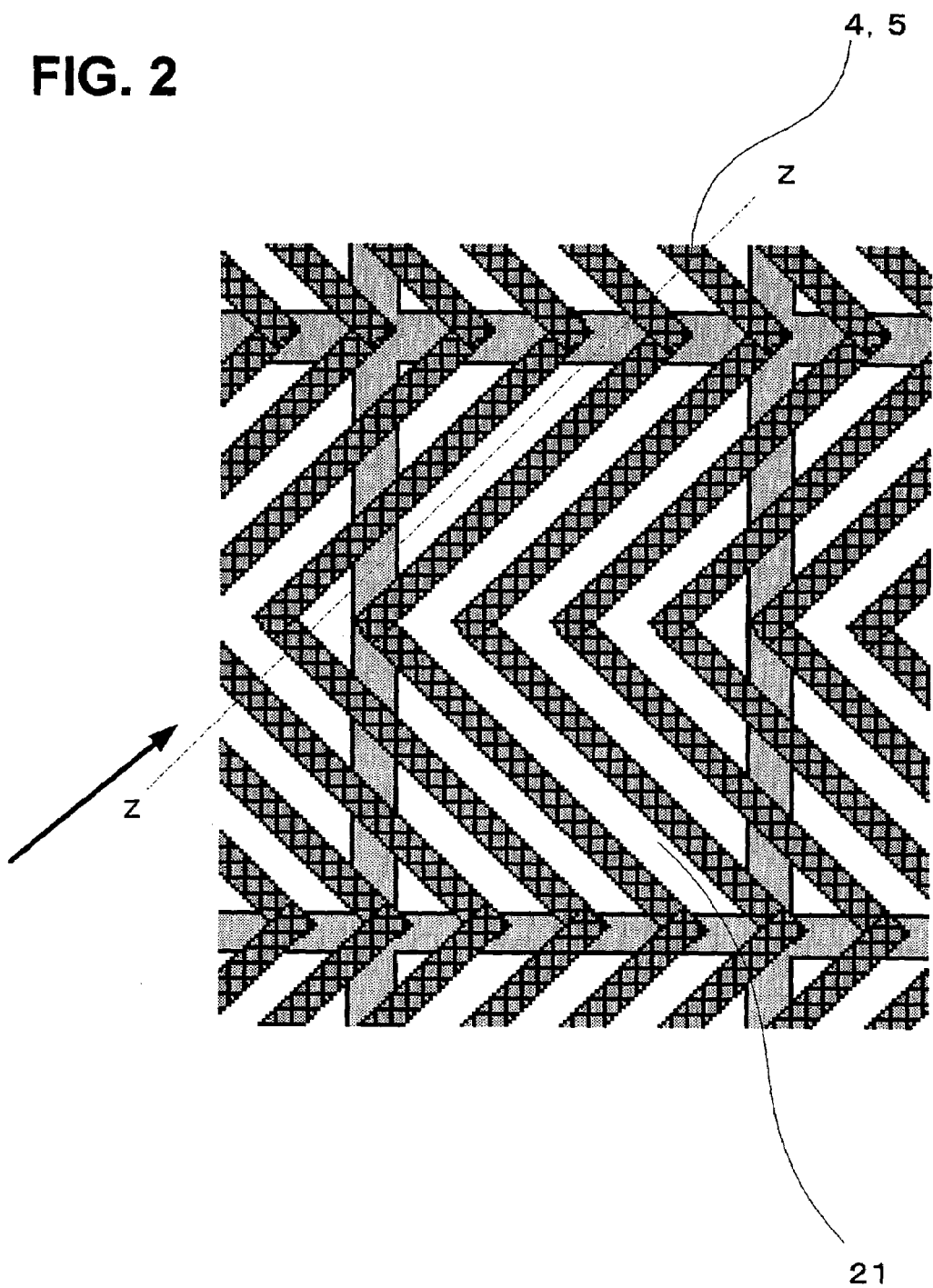
FIG. 2 is a schematic plan view of a liquid crystal panel showing an outline of patterns of protrusions.

FIG. 2 is a plan view (a view seen along the direction perpendicular to the substrate surface) schematically showing patterns of protrusions 4 and 5. The protrusions 4 and 5 have zigzag patterns in a pixel matrix 21, and the distance between two adjacent protrusions, that is the distance between the center lines of adjacent protrusions 4 and 5, is set to be 13 μm, for example. It is to be noted that the protrusions 4 and 5 have the same patterns that are overlapped with each other as described above.

Figure 6:
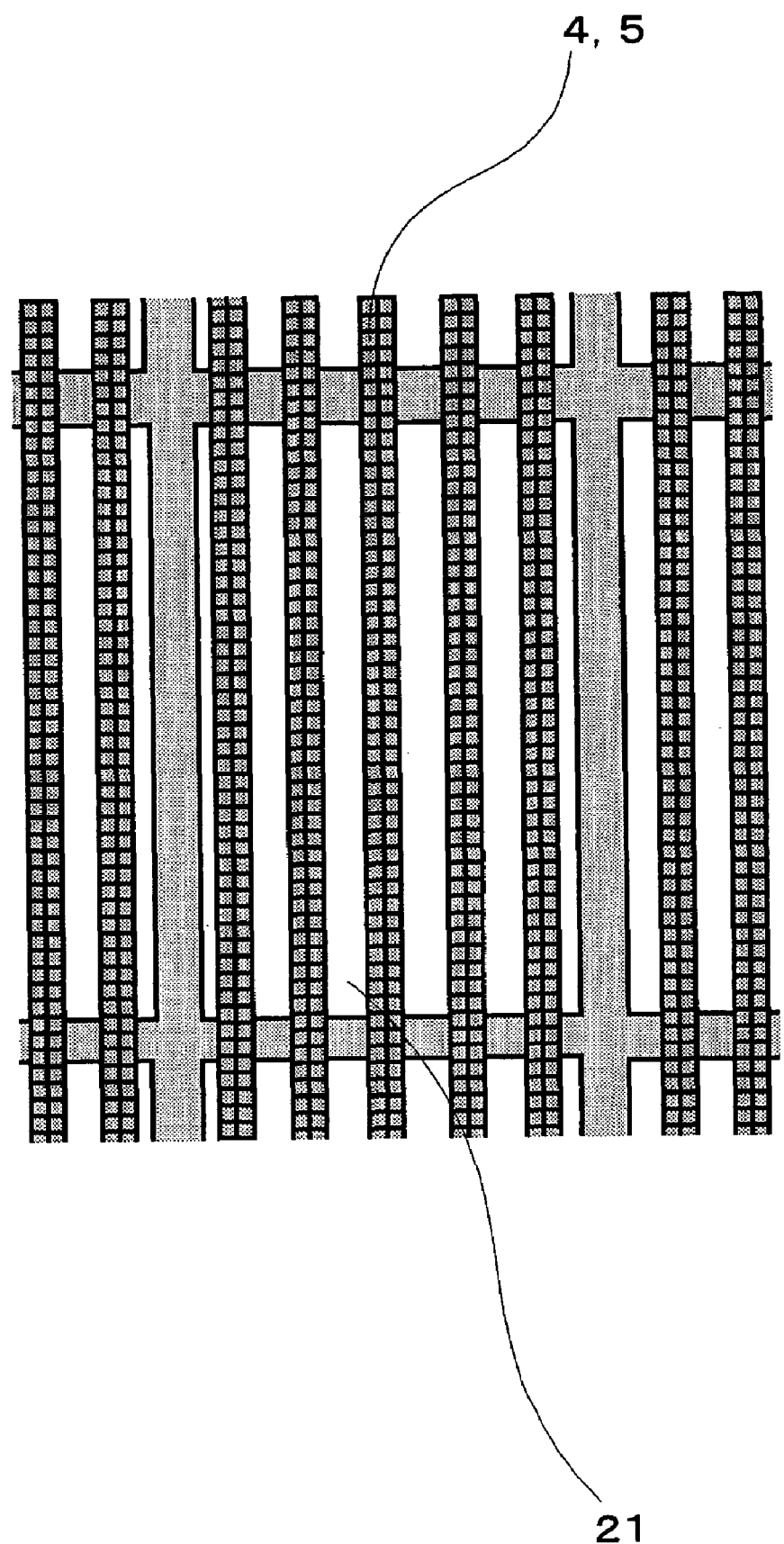
FIG. 6 is a schematic plan view of a liquid crystal panel showing an outline of other patterns of protrusions.
Figure 7:
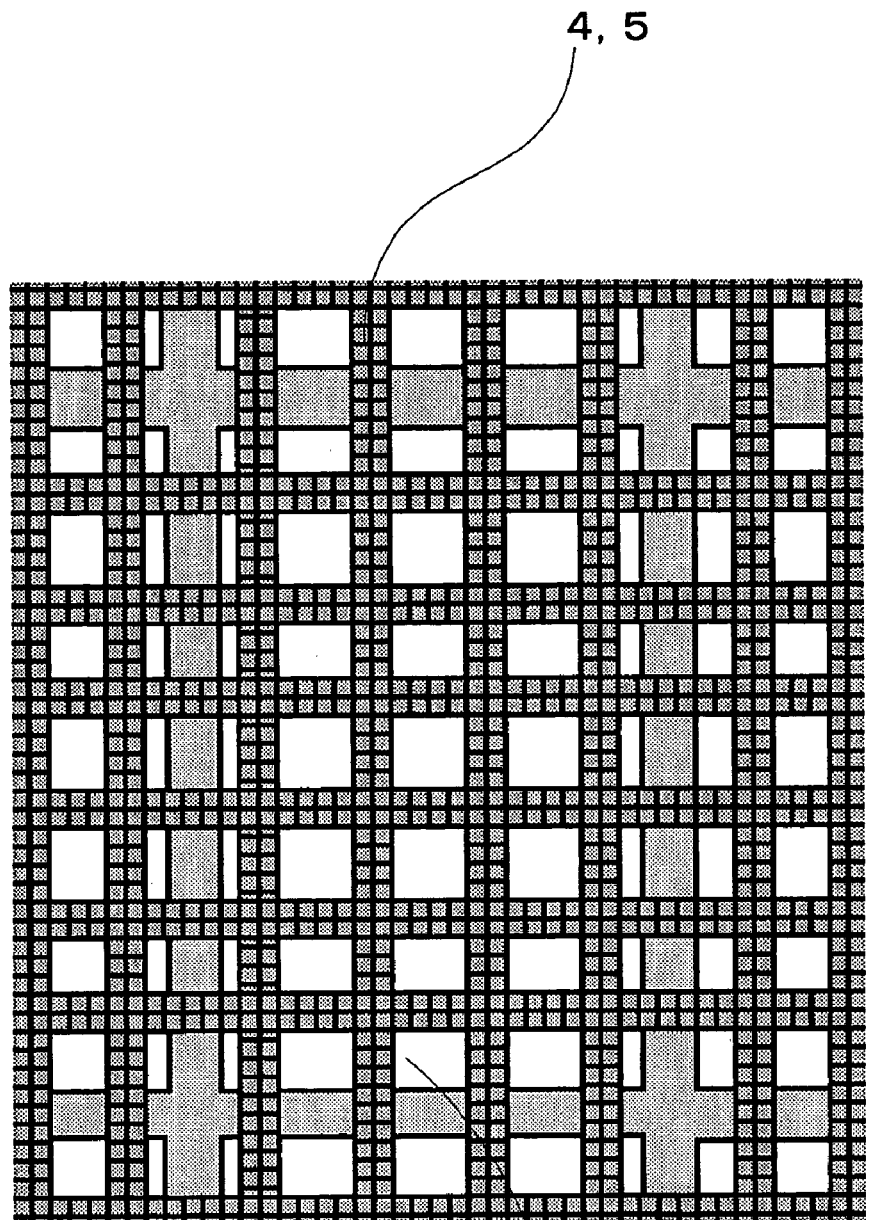
FIG. 7 is a schematic plan view of a liquid crystal panel showing an outline of other patterns of protrusions.

There is no particular limitation to the pattern of the uneven portions according to the present invention. Besides zigzag patterns such as the above, stripe patterns as shown in FIG. 6 as well as lattice patterns as shown in FIG. 7 may be used. Among them, it is preferable that the uneven portions have stripe shapes in plural directions within one pixel when seen along the direction perpendicular to the substrate surface, as are realized in the zigzag patterns shown in FIG. 2, and lattice patterns shown in FIG. 7, so as to have the liquid crystal molecules tilted in various directions within a pixel, thus realizing a wide viewing angle.

In these arrays of uneven portions, when no voltage is applied (the left side of FIG. 1), the liquid crystal molecules 6 constituting the liquid crystal are aligned vertically along the normal line to the vertical alignment control films 7 and 8. However, in the vicinity of the protrusions 4 and 5, the normal lines to the surface of the vertical alignment control films 7 and 8 that cover the protrusions 4 and 5, are tilted from the direction perpendicular to the substrate. Accordingly, the liquid crystal molecules 6 are made tilted, and the alignment is bent towards the direction along the substrate surface, thus forming bend alignment.

Therefore, when polarizing plates are disposed in a cross-Nicol arrangement, the alignment of the liquid crystal molecules 6 in the vicinity of the protrusions 4 and 5 contributes to the display, so that a white display state is realized.

On the other hand, when a voltage is applied, as shown in the right side of FIG. 1, the liquid crystal molecules 6 in the vicinity of the protrusions 4 and 5 are aligned vertically in the direction of the voltage application, due to the positive dielectric constant anisotropy, realizing a black display state. Hereupon, liquid crystal molecules 6 away from the protrusions 4 and 5 are always aligned vertically, irrespective of the state of voltage application. Accordingly, they do not contribute to the display.

In this way, liquid crystal molecules that contribute to the display are only those 6 in the vicinity of the protrusions 4 and 5 in this embodiment. Therefore, the time for the alignment of liquid crystal to be propagated becomes shorter. Furthermore, the OCB (optically compensated bend alignment) effect is obtained (see, for example, Asia Display '98 Digest, S. Onda et al., 1988, p. 1055) by the bend alignment of the liquid crystal molecules 6 in the vicinity of the protrusions 4 and 5, which gives a shorter display response speed.

In this case, it is preferable that a polarizing plate is disposed on the outside of each substrate, and an optical compensation film is sandwiched between each polarizing plate and each substrate, making use of the feature of the wide viewing angle of the multi-domain mode liquid crystal panel. For example, it is possible to improve the contrast, transmission, etc., by installing a biaxial, optical compensation film into a liquid crystal display device according to the present invention wherein the liquid crystal molecules are aligned in two separate orientations.

The brightness is lowered, since the liquid crystal away from the protrusions 4 and 5 does not contribute to the display. However, it is to be noted that the lowering of the brightness can be prevented by narrowing the distance between adjacent protrusions 4 and 5.

In this case, when only the vertical alignment control films and uneven portions are present, disorder of alignment of liquid crystal molecules would come about. For example, if the distance between adjacent protrusions 4 and 5 is made too narrow, marks which appear when the surface of a liquid crystal panel is pressed with a finger, would persist for a long time, or would not disappear. However, when the above-described polymer layer 11 is used, this problem is solved. That is, use of the polymer layer will further stabilize the alignment state.

Furthermore, it may be possible not to use vertical alignment control films, since the polymer layer, when used, acts to align the liquid crystal molecules vertically to each liquid crystal layer contacting surface.

The alignment control films are disposed on structures that give uneven portions. This will make the uneven portions less uneven. Thus, it is possible to make use of the unevenness of the surfaces of the structures as they are, so as to contribute to the alignment in the liquid crystal layer, by not employing alignment control films. In this case, since neither alignment treatments such as rubbing nor alignment control films are used, there will be a significant economical effect. Jumboization of liquid crystal panels becomes easier, too.

Figure 3:
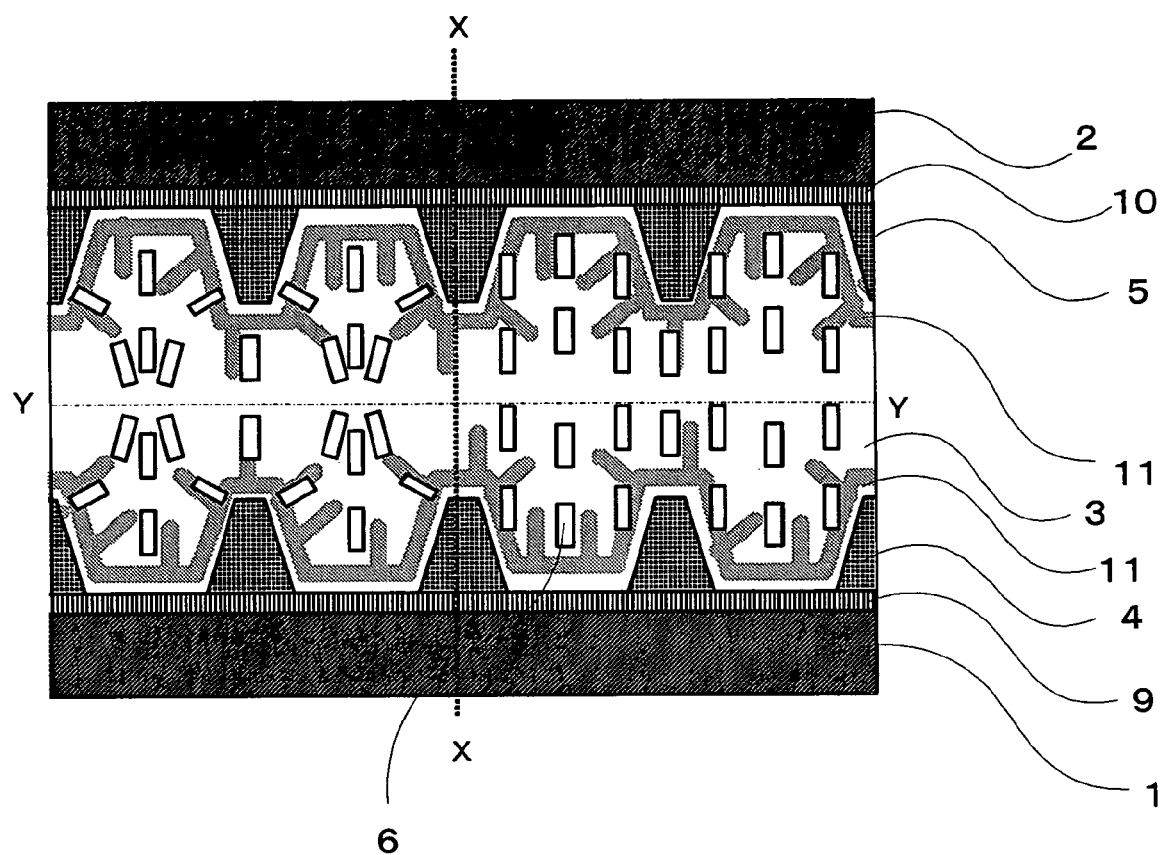
FIG. 3 is a schematic side cross-sectional view of an essential part of another liquid crystal panel according to the present invention.

FIG. 3 shows an example which does not use a vertical alignment control film. FIG. 3 is approximately the same as FIG. 1, except that there is no vertical alignment control film in FIG. 3. In this case, it is possible to make the distance between the protrusions narrower. It is to be noted here, that it is possible to emphasize the effect to bend the alignment of liquid crystal molecules towards the direction along the substrate surface, by making the protrusions higher, thus increasing the sloping area of the protrusions, as shown in FIG. 3.

In a liquid crystal panel according to the present invention, it is preferable that the liquid crystal molecules are aligned substantially symmetrical to each other about the center surface between a pair of substrates, that is, substantially symmetrical to each other in the vertical direction about the dashed line Y-Y in the cases of FIGS. 1 and 3. By this, the OCB effect by the bend alignment is obtained as shown in FIGS. 1 and 3, realizing a higher display response speed.

Such a state is realized by having uneven portions present on both the liquid crystal layer contacting surfaces so that the uneven portions on both two liquid crystal layer contacting surfaces, are disposed, as substantially overlapped with each other when seen along the direction perpendicular to the substrate surface, as shown in FIGS. 1 and 2. The state of "the uneven portions are disposed as substantially overlapped with each other" can be confirmed by the fact that the display response speed of the liquid crystal becomes higher, compared with a state in which uneven portions are disposed as not overlapped with each other. In reference to the projected areas shown in FIG. 2, it is preferable for them to be overlapped with each other by 80% or more. It is more preferable for them to be overlapped with each other by 90% or more. It is still more preferable for them to be overlapped with each other by 95% or more.

It is to be noted here that the alignment of liquid crystal molecules to obtain the OCB effect by the bend alignment, may be considered to have a state in which the liquid crystal molecules are aligned substantially symmetrical to each other about a certain surface perpendicular to the substrates. The phrase "a certain surface" in this case means, for example, the surface shown by the dotted lines Z-Z in FIGS. 1 and 2. FIG. 1 is a side cross-sectional view of a liquid crystal panel seen along the direction of the arrow in FIG. 2 that is in parallel with the surface Z-Z, from which it is understood that the liquid crystal molecules are symmetrical to each other about the surface Z-Z.

When such a viewpoint is considered, it follows that the OCB effect by the bend alignment can be obtained even when there are uneven portions only on one of two liquid crystal layer contacting surfaces. For example, such a constitution is obtained when only either the lower uneven portions or the upper uneven portions in FIG. 1 exist, in an arrangement as shown in FIG. 2 when seen along the direction perpendicular to the substrate of a liquid crystal panel.

The polymer according to the present invention is obtained by subjecting a liquid crystal composition comprising a liquid crystal having a positive dielectric constant anisotropy and a polymerizable compound disposed between a pair of substrates, to active energy ray irradiation with or without voltage application. Heat may be provided at the time of the active energy ray irradiation, or heat may be provided instead of the active energy ray irradiation. If the irradiation is performed with voltage application, liquid crystal molecules in the vicinity of uneven portions are directed more to the direction perpendicular to the substrate surface, when the liquid crystal panel is seen along the direction in parallel with the substrate surface, which results in quicker switch-over from the a white display state to a black display state, when the liquid crystal panel is in operation. To compare, if the irradiation is performed without voltage application, liquid crystal molecules in the vicinity of uneven portions are directed more into a lying state, away from the direction perpendicular to the substrate surface, when the liquid crystal panel is seen along the direction in parallel with the substrate surface, which results in quicker switch-over from a black display state to a white display state when the liquid crystal panel is in operation.

Any rays may be used as the active energy rays, including visible rays, as long as they do not contradict the gist of the present invention. However, ultraviolet rays are preferable from the viewpoint of practicality.

As a polymerizable compound contained in the liquid crystal composition, any compound may be used as long as it has a reactive group that can be polymerized by active energy rays and/or heat curing, and the resulting polymer, singly or in combination with vertical alignment control films, can have a property to align liquid crystal molecules in the direction perpendicular to the surface of the polymer. It may be a monomer, oligomer or polymer. The reactive group means a polymerizable functional group which can be polymerized by irradiation with active energy rays and/or by heat curing, such as an acrylate group, methacrylate group, vinyl group, allyl group, or epoxy group.

The polymerizable compound according to the present invention may be composed of a single component or a plurality of components. A polymerizable compound consisting of or comprising cross-linkable components is preferable. Examples of cross-linkable components are those having a structural component capable of polymerizing with other molecules through the action of active energy ray irradiation such as ultraviolet rays and/or heat, by comprising, in a molecule, a plurality of polymerizable functional groups such as acrylate groups, methacrylate groups, epoxy groups, vinyl groups and allyl groups. It is to be noted that a polymerizable compound having a ring structure such as an aromatic ring and/or alicyclic ring shows a higher polymerization speed, and is advantageous. A polymerization initiator for initializing the polymerization of the polymerizable compound may be contained in the liquid crystal composition according to the present invention.

Liquid crystal panels formed as described above may be favorably used for liquid crystal display device applications in place of conventional liquid crystal panels, such as a notebook personal computer, TV set, portable TV set, monitors, projection-type projectors, etc. These liquid crystal display devices have stabilized liquid crystal alignment, and accordingly excellent display quality, high display response speed, and excellent viewing angle properties.

EXAMPLES

The detailed explanation of examples of the present invention will follow. The following evaluation procedure was employed.

(Measurement of Display Response Speed)

Polarizing plates were attached to a liquid crystal panel in a cross-Nicol arrangement. The measurement was performed with a luminance meter. The value $\tau_f$ was measured, which was defined as a time required for the change from 90% to 10% in the transmittance of a panel when a voltage at which the transmittance of the panel showed a minimum was applied, starting at 0 (zero) volt. Also, the value $\tau_r$ was measured, which was defined as a time required for the change from 10% to 90% in the transmittance of a panel when a voltage was changed from a value at which the transmittance of the panel showed a minimum, to 0 (zero) volt. The value $\tau_f + \tau_r$ was used as the response speed.

Example 1

A liquid crystal panel having a constitution shown in FIGS. 1 and 2 was prepared. Vertical alignment control films were installed on the protrusions at both sides of the liquid crystal layer. A liquid crystal composition comprising a liquid crystal having a positive dielectric constant anisotropy ($\Delta \in$) of 9.9, and an acrylate monomer having two acrylate groups in a molecule in an amount of 2% by weight, was disposed between the substrates.

After the liquid crystal composition had been introduced into the space controlled by a spacer, between the substrates positioned in parallel, irradiation was performed with ultraviolet rays having a wavelength of 365 nm at an intensity of 20 mW/cm$^2$ for about 10 J/cm$^2$, during which a voltage of 10 V was applied between the electrodes, to form a liquid crystal panel comprising the polymer according to the present invention.

The fact that the polymer was generated on the liquid crystal layer contacting surface as shown in FIG. 1 was confirmed by dismantling the liquid crystal panel which had been processed as described above, washing the surface of the vertical alignment control film with acetone, and then finding the polymer on the vertical alignment control film.

By this constitution, it was confirmed by the observation in a cross-Nicol arrangement that the liquid crystal molecules were aligned in the direction perpendicular to the surface of the polymer, and were bent towards the direction along the substrate surface at the time of no voltage application, owing to the action of the protrusions and the combination of the polymer and vertical alignment control films.

As a result of the above-described experiment, it was found that an improved display response speed of about 2 ms was obtained by using the above-described polymer, while it was about 4 ms when the polymer was not used.

In addition, there appeared no marks when the surface of the liquid crystal panel was pressed with a finger. The fact that the multi-domain mode alignment was realized in the liquid crystal panel was confirmed by its wide viewing angle of 160° towards the upside, downside, right and left directions.

Example 2

Figure 4:
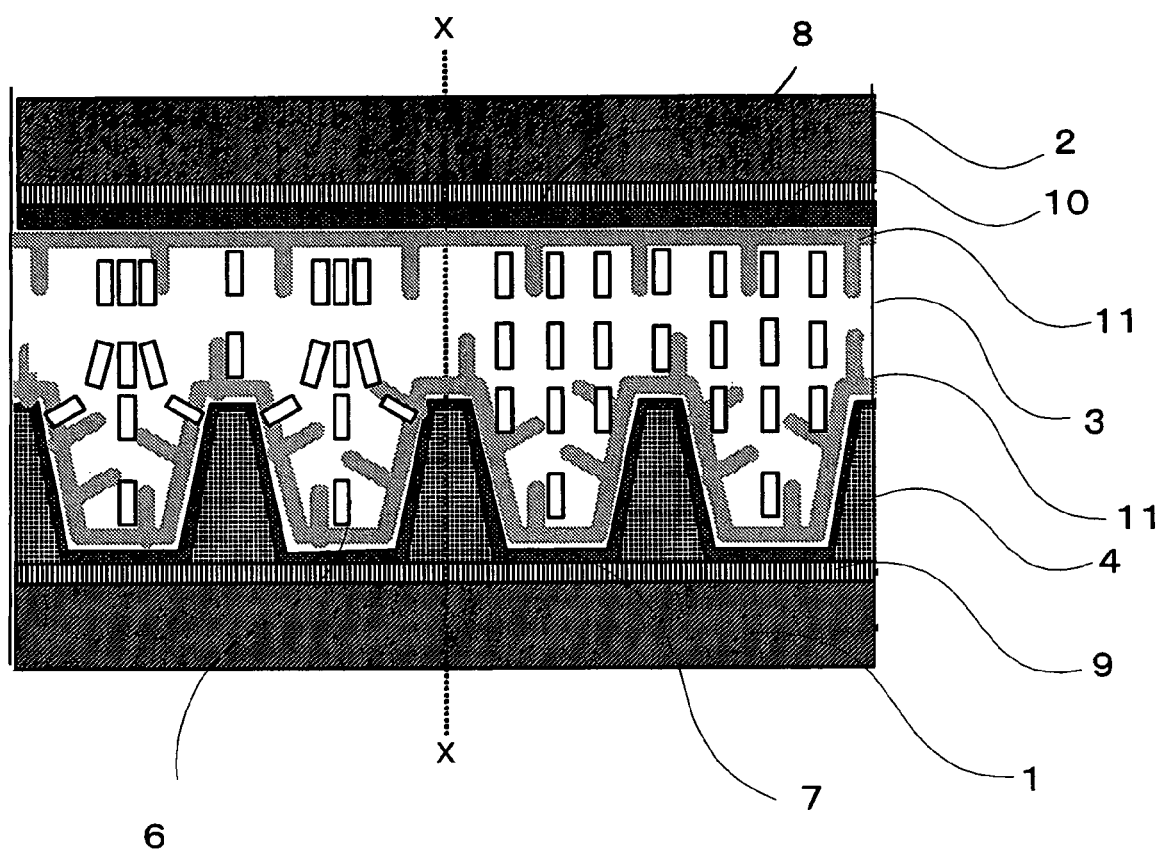
FIG. 4 is a schematic side cross-sectional view of an essential part of another liquid crystal panel according to the present invention.

FIG. 4 is the same as FIG. 1, except that the protrusions were formed only on one side of the liquid crystal layer, and the height of the protrusions was 6 μm. The pattern of the protrusions when seen along the direction perpendicular to the substrate surface was the same as the patterns in FIG. 2.

Since the protrusions were present only on one of the two liquid crystal layer contacting surfaces, it was possible to make the alignment of the liquid crystal molecules substantially symmetrical to each other about a certain surface perpendicular to the substrate.

By installing protrusions only on one side as described in this example, the production is simplified, compared with a case in which structures are installed on both sides.

Although the protrusions were installed only on one side of the liquid crystal layer in this example, it was possible to further facilitate the bend alignment by making the slope of the protrusions longer, resulting in high display response speed of 2 ms.

Example 3

FIG. 3 is the same as FIG. 1, except that no vertical alignment control films were used, the height of the protrusions was 4 μm, and the constitution of the liquid crystal composition was changed as described below. The pattern of the protrusions when seen along the direction perpendicular to the substrate surface was the same as the patterns in FIG. 2. The liquid crystal composition was prepared by adding 0.3% by weight of an acrylate monomer having two acrylate groups in a molecule, as well as 0.003% by weight of a polymerization initiator, to the liquid crystal. After the liquid crystal composition had been introduced into the space between the substrates controlled by a spacer, the substrate being positioned in parallel, irradiation was performed with ultraviolet rays having a wavelength of 365 nm at an intensity of 20 mW/cm$^2$ for about 10 J/cm$^2$, during which a voltage of 10 V was applied between the electrodes.

By this constitution, it was confirmed by the observation in a cross-Nicol arrangement that the liquid crystal molecules were aligned in the direction perpendicular to the surface of the polymer, and were bent towards the direction along the substrate surface at the time of no voltage application, by the actions of the protrusions and the polymer.

Because the protrusions were not flattened by alignment control films in this example, it was possible to efficiently align the liquid crystal molecules. Accordingly, it was possible to realize a high display response speed of 2 ms. In addition, there appeared no marks when the surface of the liquid crystal panel was pressed with a finger.

Example 4

Figure 5:
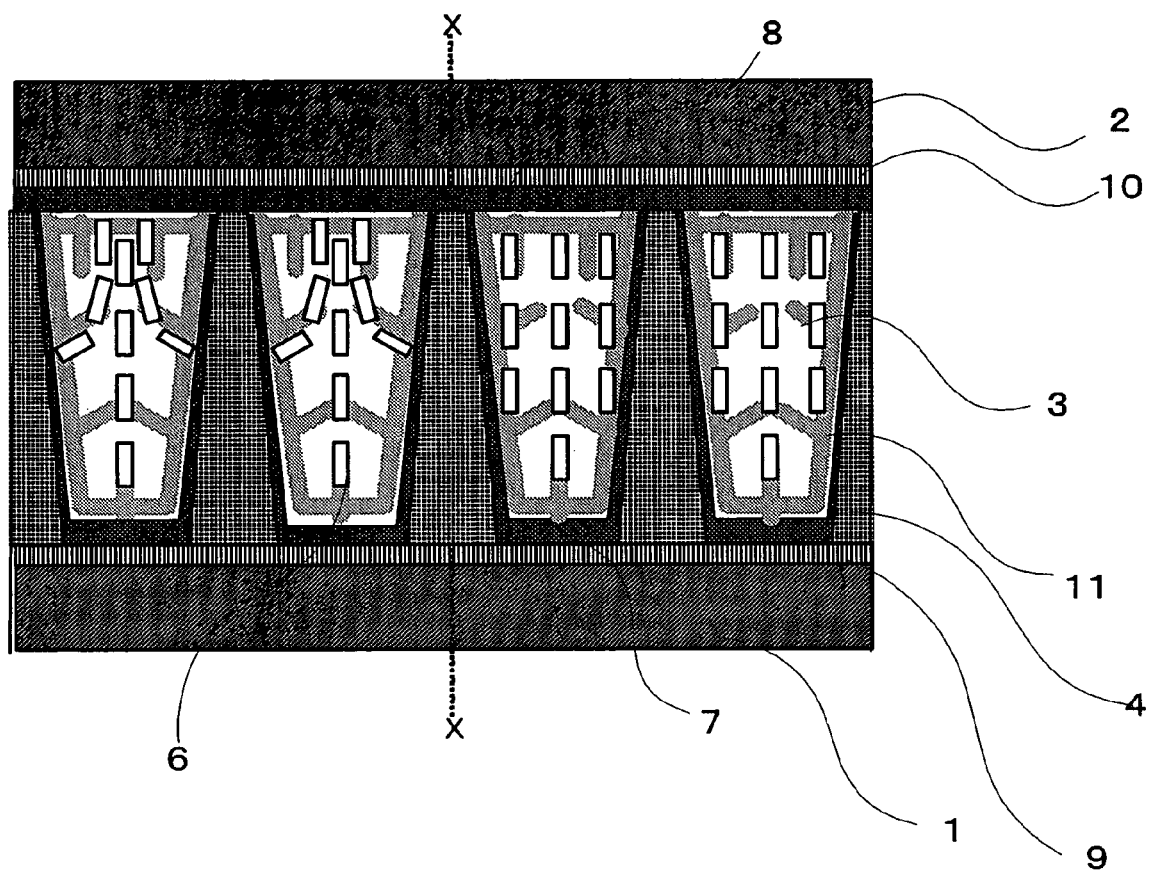
FIG. 5 is a schematic side cross-sectional view of an essential part of another liquid crystal panel according to the present invention.

FIG. 5 is an example in which protrusions larger than those in EXAMPLE 2 with a height as high as the size of the cell gap were employed. That is, the thickness of the liquid crystal layer was controlled by the protruding parts of uneven portions according to the present invention. In this way, it was not necessary to use a spacer.

A high display response speed of 2 ms was realized, proving that the effect of the present invention can be exhibited in such a constitution.

What is claimed is:

1. A liquid crystal panel having a liquid crystal layer sandwiched between a pair of substrates, wherein: uneven portions for bending the alignment of liquid crystal molecules towards the direction along the substrate surface are installed on both of two liquid crystal layer contacting surfaces where said liquid crystal layer contacts its adjacent layers; and said liquid crystal layer comprises a liquid crystal having a positive dielectric constant anisotropy, and a polymer obtained by subjecting a polymerizable compound in said liquid crystal layer to irradiation with active energy rays, irradiation with active energy rays and heat curing, or heat curing, with or without application of a voltage; wherein liquid crystal molecules exist locally near the uneven portions aligned as tilted from the direction perpendicular to the substrate surface when voltage is not applied, while all of the liquid crystal molecules near the uneven portions are aligned vertically to the substrate surface when voltage is applied;
    said uneven portions are present, independent from each other, on both of said two liquid crystal layer contacting surfaces; and the uneven portions on both of the two liquid crystal layer contacting surfaces are disposed to overlap with each other by 80% or more when seen along a direction perpendicular to the substrate surface.

2. A liquid crystal panel according to claim 1, wherein at least one of said layers adjacent to said liquid crystal layer is a vertical alignment control film.

3. A liquid crystal panel according to claim 1, wherein the layers adjacent to said liquid crystal layer are not vertical alignment control films, and said polymer has a property to align liquid crystal molecules perpendicular to the surface of the polymer.

4. A liquid crystal panel according to claim 1, wherein said polymer has been formed by polymerization of the polymerizable compound with application of a voltage to the liquid crystal layer.

5. A liquid crystal panel according to claim 1, wherein:
    said uneven portions are present on both of said two liquid crystal layer contacting surfaces; and
    the uneven portions on both of the two liquid crystal layer contacting surfaces are disposed, substantially overlapped with each other when seen along the direction perpendicular to the substrate surface.

6. A liquid crystal panel according to claim 1, wherein said said liquid crystal molecules are aligned substantially symmetrical to each other about the center surface between said pair of substrates.

7. A liquid crystal panel according to claim 1, wherein said uneven portions are present only on one of said two liquid crystal layer contacting surfaces.

8. A liquid crystal panel according to claim 1, wherein said liquid crystal molecules are aligned substantially symmetrical to each other about a certain surface perpendicular to said substrates.

9. A liquid crystal panel according to claim 1, wherein the thickness of the liquid crystal layer is controlled by protruding parts of said uneven portions.

10. A liquid crystal panel according to claim 1, wherein said panel is a multi-domain mode liquid crystal panel with said uneven portions having stripe shapes in plural directions in a pixel, when seen along the direction perpendicular to the substrate surface.

11. A liquid crystal panel according to claim 1, wherein a polarizing plate is disposed at the outside of each substrate, and an optical compensation film is sandwiched between each of said polarizing plates and each of said substrates.

12. A liquid crystal display device equipped with the liquid crystal panel according to any one of claims 1 to 11.

13. A liquid crystal panel having a liquid crystal layer sandwiched between a pair of substrates, wherein:
    uneven portions are installed on both of two liquid crystal layer contacting surfaces where said liquid crystal layer contacts its adjacent layers;
    a polymer layer is formed on the liquid crystal layer contacting surface by subjecting a polymerizable compound in said liquid crystal layer to irradiation with active energy rays, irradiation with active energy rays and heat curing, or heat curing, in order to have liquid crystal molecules existing locally near the uneven portions aligned as tilted from the direction perpendicular to the substrate surface when voltage is not applied, while all of the liquid crystal molecules near the uneven portions are aligned vertically to the substrate surface when voltage is applied;

said uneven portions are present, independent from each other, on both of said two liquid crystal layer contacting surfaces; and the uneven portions on both of the two liquid crystal layer contacting surfaces are disposed to overlap with each other by 80% or more when seen along a direction perpendicular to the substrate surface.

* * * * *